(12) United States Patent
Nam et al.

(10) Patent No.: US 7,049,261 B2
(45) Date of Patent: May 23, 2006

(54) ZEOLITE CATALYST AND PREPARATION PROCESS FOR $NO_x$ REDUCTION

(75) Inventors: In-Sik Nam, Pohang (KR); Sung Dae Yim, Daegu (KR); Joon Hyun Baik, Pohang (KR); Se Hyuck Oh, Troy, MI (US); Byong Kwon Cho, Rochester Hills, MI (US)

(73) Assignees: General Motors Corporation, Detroit, MI (US); Pohang University of Science and Technology, Pohang (KR)

( * ) Notice: Subject to any disclaimer, the term of this patent is extended or adjusted under 35 U.S.C. 154(b) by 96 days.

(21) Appl. No.: 10/723,306

(22) Filed: Nov. 26, 2003

(65) Prior Publication Data

US 2004/0171476 A1    Sep. 2, 2004

Related U.S. Application Data

(60) Provisional application No. 60/474,492, filed on May 30, 2003.

(51) Int. Cl.
*B01J 29/06* (2006.01)

(52) U.S. Cl. .......................... 502/64; 502/60

(58) Field of Classification Search ............... 502/60, 502/64; 423/239.2
See application file for complete search history.

(56) References Cited

U.S. PATENT DOCUMENTS

| | | | | |
|---|---|---|---|---|
| 3,755,153 A | * | 8/1973 | Rosback ..................... 585/820 |
| 4,052,337 A | * | 10/1977 | Nishikawa et al. ........... 502/60 |
| 4,170,571 A | * | 10/1979 | Ritscher ..................... 423/718 |
| 4,297,328 A | * | 10/1981 | Ritscher et al. .......... 423/213.2 |
| 4,473,535 A | * | 9/1984 | Kittrell et al. ........... 423/239.2 |
| 4,961,917 A | * | 10/1990 | Byrne ..................... 423/239.2 |
| 4,962,075 A | * | 10/1990 | Green et al. .................. 502/71 |
| 5,116,586 A | * | 5/1992 | Baacke et al. .......... 423/239.2 |
| 5,171,553 A | * | 12/1992 | Li et al. .................. 423/239.2 |
| 5,223,236 A | * | 6/1993 | Inoue et al. ............. 423/213.2 |
| 5,270,024 A | * | 12/1993 | Kasahara et al. ........ 423/213.2 |
| 5,279,997 A | * | 1/1994 | Montreuil et al. ............ 502/62 |
| 5,427,753 A | * | 6/1995 | Miura et al. ............. 423/239.2 |

* cited by examiner

*Primary Examiner*—Christina Johnson
(74) *Attorney, Agent, or Firm*—Kathryn A. Marra

(57) ABSTRACT

A zeolite catalyst and a process for preparing a zeolite catalyst which is both capable of catalyzing the removal of nitrogen oxides from a gaseous medium across a broad temperature range and is operationally and hydrothermally stable at high reaction temperatures. The zeolite catalyst includes a zeolite carrier having a mole ratio of typically from about 14 to about 95 and copper ions supported on the zeolite carrier. The zeolite catalyst is prepared by providing a zeolite carrier, reacting copper with the zeolite carrier by carrying out an ion exchange reaction in a cupric salt aqueous solution at a temperature of between about 4° C. and room temperature (25° C.), and then drying and calcining the catalyst.

6 Claims, 1 Drawing Sheet

ZEOLITE CATALYST AND PREPARATION PROCESS FOR NO$_X$ REDUCTION

CROSS REFERENCE TO RELATED APPLICATION

This application claims priority of U.S. Provisional Application Ser. No. 60/474,492 filed May 30, 2003.

FIELD OF THE INVENTION

The present invention relates to catalysts used in the removal of nitrogen oxides from a gaseous medium. More particularly, the present invention relates to a zeolite catalyst and a process for preparing a zeolite catalyst which is hydrothermally stable and capable of operation over a broad temperature range in the removal of nitrogen oxides from a gaseous medium using ammonia or urea as the reductant.

BACKGROUND OF THE INVENTION

Exhaust gases are emitted by industrial sources such as power plants and incinerators as well as transportation sources such as airplanes and cars. Nitrogen oxides, as a major component of exhaust gases, contribute to the formation of photochemical smog and acid rain when discharged into the atmosphere. Thus, much research has been devoted to developing techniques for efficiently removing nitrogen oxides from exhaust gases and other gaseous media.

Techniques used to remove nitrogen oxides from gaseous media typically involve selective catalytic reduction of the nitrogen oxides in the gaseous medium. Catalytic reduction of nitrogen oxides involves a multi-step process in which a reducing agent such as urea is first decomposed to ammonia and carbon dioxide. The ammonia then reacts with the nitrogen oxides to form molecular nitrogen and water, which is harmlessly emitted into the atmosphere.

One of the most effective methods used to remove nitrogen oxides from gaseous media is known as the Selective Catalytic Reduction (SCR) method. Various reducing agents which are applicable to the SCR method include ammonia, urea, hydrocarbon and the like. Catalysts which are suitable for the SCR method include metal oxide catalysts such as vanadia-titania type catalysts and various zeolite catalysts.

Recently, much research has been devoted to developing catalysts which have a high nitrogen oxide-removing capability across a broad temperature range. A need therefore exists for a catalyst which is capable of facilitating the efficient removal of nitrogen oxides from gaseous media at relatively low reaction temperatures, while remaining hydrothermally stable and catalytically active at relatively high reaction temperatures.

SUMMARY OF THE INVENTION

The present invention is generally directed to a zeolite catalyst and a process for preparing a zeolite catalyst which is both capable of catalyzing the removal of nitrogen oxides from a gaseous medium across a broad temperature range and is operationally and hydrothermally stable at high reaction temperatures. The zeolite catalyst includes a zeolite carrier (ZSM-5) having a mole ratio of Si/Al typically from about 14 to about 95 and copper ions supported on the zeolite carrier. The zeolite catalyst (Cu/ZSM-5) is prepared by carrying out an ion exchange reaction of copper ions on the ZSM-5 zeolite in a cupric salt aqueous solution at a temperature of between about 4° C. and room temperature (25° C.), and then drying and calcining the catalyst.

BRIEF DESCRIPTION OF THE DRAWING

The invention will be further understood with reference to the accompanying drawing, in which.

DETAILED DESCRIPTION OF THE INVENTION

Figure 1:
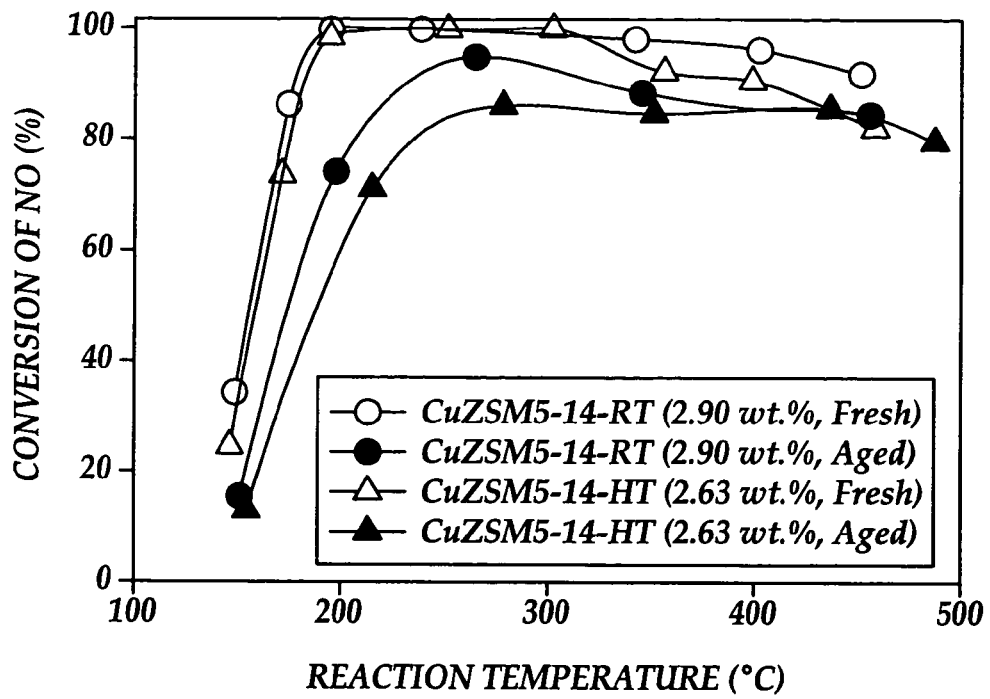
FIG. 1 is a graph depicting nitrogen oxides removal efficiency (%) of Cu/Zeolite catalysts as a function of reaction temperatures, wherein the Cu/zeolite catalysts are prepared according to the methods of Examples 1 and 4.

The present invention is directed to a catalyst and a process for preparing a catalyst which is particularly effective in catalyzing the removal of nitrogen oxides from a gaseous medium. The catalyst of the present invention exhibits effective nitrogen oxide-removing capability over a broad temperature range and is characterized by high hydrothermal stability. The catalyst can therefore be used effectively in SCR (Selective Catalyst Reduction) processes under a wide range of conditions.

According to the present invention, the zeolite catalyst includes copper ions supported on a zeolite carrier by slowly carrying out ion exchange of zeolite ZSM5 in cupric salt aqueous solution at a relatively low temperature. Consequently, the copper ions gradually react with the zeolite under mild, low-temperature conditions, and thus, are less susceptible to oxidation, during the ion exchange reactions. The resulting catalyst has high thermodynamic stability and exhibits superior nitrogen oxide-removing capability in high-humidity environments and across a broad temperature spectrum including low and high temperatures.

The zeolite catalyst of the present invention includes copper ions that are supported on a zeolite carrier in which the molar ratio of Si/Al is typically from about 14 to about 95, and preferably, from about 14 to about 30. The catalyst is prepared by carrying out an ion exchange reaction between the copper ions and the zeolite carrier in a cupric salt aqueous solution at a temperature of typically from about 4° C. to about 25° C. The Cu/zeolite carrier product is then filtered, dried and calcinated to obtain the catalytically-active Cu/zeolite catalyst.

The cupric salt aqueous solution used to carry out the ion exchange reaction according to the present invention may be copper sulfate ($CuSO_4$), copper nitrate [$Cu(NO_3)_2$], copper acetate [$Cu(CH_3COO)_2$] or copper chloride ($CuCl_2$), in non-exclusive particular. The concentration of the cupric salt aqueous solution is preferably from about 0.001 M to about 10 M in accordance with the desired content of copper on the catalyst. It is preferable for the ion exchange reaction in the cupric salt aqueous solution to be carried out at typically from about 4° C. to about 25° C. for a period of typically from about 6 hours to about 48 hours.

The copper is preferably present on the zeolite carrier in quantities ranging from typically about 0.1% to about 10.0% by weight based on the total weight of the catalyst. Below this range, nitrogen oxide-reducing efficiency of the catalyst is reduced. Above this range, nitrogen oxide-removing efficiency of the catalyst will not be improved appreciably since the excess copper ions lump into a mass, forming a metal-oxide. Most preferably, the copper is present on the zeolite carrier in a quantity ranging from typically about 2.5% to about 3.5% by weight.

After the ion exchange reaction is completed, the Cu/zeolite product is typically filtered, rinsed, dried and calcinated at a temperature of typically from about 300° C. to about 700° C. for typically about 5 hours to obtain the catalytically-active Cu/zeolite catalyst. This stabilizes the ion-exchanged copper ions on the catalyst and minimizes variations in catalytic activity of the catalyst among various reaction conditions.

The present invention is further directed to a method for removing nitrogen oxides from a gaseous medium such as automobile exhaust gases, for example. The method includes reducing nitrogen oxides in the gaseous medium by mixing the gaseous medium containing the nitrogen oxides with a reducing agent and then passing the reducing agent/gaseous medium mixture through a Cu/zeolite catalyst prepared according to the process of the present invention. The quantity of reducing agent used depends on the quantity and concentration of the nitrogen oxides to be removed from the gaseous medium.

According to the present invention, ammonia or urea, in non-exclusive particular, may be used as a reducing agent. The quantity of reducing agent is properly controlled in accordance with the quantity and concentration of nitrogen oxides to be removed. The reduction reaction is most preferable when the nitrogen oxide-reducing reaction is carried out in a temperature range of from typically about 150° C. to about 500° C. and at a space velocity of from typically about 1000 $hr^{-1}$ to about 400,000 $hr^{-1}$. As a result of the reduction reaction, the nitrogen oxides in the exhaust gas are reduced to molecular nitrogen and water.

The present invention will be further understood by consideration of the following examples, which shall not be construed as limiting the scope of the invention.

EXAMPLE 1

A Cu/zeolite (CuZSM5-14-RT) catalyst was prepared by mixing 15 g of Zeolite ZSM5 (Tosoh Co.) having a mole ratio of Si/Al=14 with a copper (II) acetate [$Cu(CH_3CO_2)_2$] aqueous solution of 0.01 M. An ion exchange reaction between the zeolite and the copper ions in the copper (II) acetate was carried out by agitating the mixture at room temperature (about 25° C.) for 24 hours. The resulting Cu/zeolite was then filtered, washed with deionized water and dried at 110° C. for 12 hours. The sequential process including the ion exchange reaction, filtering, washing and drying process outlined above was repeated three times. The resulting Cu/zeolite product was then calcined at 500° C. for 5 hours to obtain the Cu/zeolite catalyst, which comprised copper ions at 2.90% by weight.

EXAMPLE 2

Nitrogen oxide-removing efficiency of the fresh, hydrothermally-unaged 2.90% Cu/zeolite catalyst prepared according to Example 1 was measured by adding a mixture of 500 ppm of NO and 500 ppm of ammonia (NH3) to a packed-bed flow reactor containing a catalyst bed including 1 g of the Cu/zeolite catalyst. A reduction reaction was carried out at a spatial velocity of 100,000 $hr^{-1}$ with a temperature change of from 150° C. to 500° C. in the presence of 5% $O_2$ and 10% $H_2O$ to remove nitrogen oxides from the mixture by reduction of the nitrogen oxides to nitrogen and water. Nitrogen dioxide removal efficiency (%) versus reaction temperatures of the fresh 2.90% Cu/zeolite catalyst prepared according to the process of Example 1 is shown by the graph in FIG. 1, in which the fresh 2.90% Cu/zeolite catalyst is represented by the line-connected open circles. It can be seen from the graph that the fresh 2.90% Cu/zeolite catalyst prepared using ion exchange reactions carried out at room temperature exhibited nearly complete NO conversion in the 200–350° C. reaction range, and this NO conversion efficiency only slightly and gradually decreased (to about 90%) beyond 350° C.

EXAMPLE 3

Hydrothermal stability of the 2.90% Cu/zeolite catalyst prepared according to Example 1 was measured by hydrothermal aging of the 2.90% Cu/zeolite catalyst in the presence of 10% water at 700° C. for 24 hours, followed by measurement of the nitrogen oxide-removing efficiency of the catalyst according to the process of Example 2. Nitrogen dioxide removal efficiency (%) versus reaction temperatures of the hydrothermally-aged 2.90% Cu/zeolite catalyst are shown in FIG. 1, in which the hydrothermally-aged 2.90% Cu/zeolite catalyst is represented by the line-connected solid circles. The graph indicates that the aged 2.90% Cu/zeolite catalyst exhibited a nitrogen oxide-removal efficiency which was somewhat lower than that of the fresh 2.90% Cu/zeolite catalyst across the 150° C.–500° C. temperature range.

EXAMPLE 4

Cu/zeolite (CuZSM5-14-HT) catalyst comprising 2.63% copper ions by weight was prepared by the same process as that in Example 1, except the mixture was agitated at a temperature of 80° C. instead of room temperature and the ion exchange reaction, filtering, washing and drying process was repeated twice instead of three times. Nitrogen oxide-removing efficiency and hydrothermal stability of the Cu/zeolite catalyst were measured according to the processes of Examples 2 and 3, respectively. The results are shown in FIG. 1, in which the fresh 2.63% Cu/zeolite catalyst is represented by the line-connected open triangles and the hydrothermally-aged 2.63% Cu/zeolite catalyst is represented by the line-connected solid triangles.

It can be seen from the graph that while the fresh 2.63% Cu/zeolite catalyst exhibited a nitrogen oxide-removing efficiency which closely matched that of the 2.90% Cu/zeolite catalyst from about 150° C. to about 325° C., the 2.90% Cu/zeolite catalyst prepared using the ion exchange reactions at room temperature exhibited higher catalytic efficiency at temperatures above about 325° C. than the catalyst prepared using the ion exchange reactions at 80° C. Accordingly, the fresh 2.90% Cu/zeolite catalyst prepared using the ion exchange reactions at room temperature according to Example 1 exhibited superior nitrogen oxide-removing efficiency at the higher (350° C. and above) reaction temperatures than did the fresh 2.63% Cu/zeolite catalyst prepared using the ion exchange reactions at 80° C. according to Example 4. Furthermore, the hydrothermally-aged 2.63% Cu/zeolite catalyst, which was prepared using the ion exchange reactions at 80° C. according to Example 4, exhibited a nitrogen oxide-removing efficiency which was lower than those of both the fresh 2.90% Cu/zeolite catalyst and the hydrothermally-aged 2.90% Cu/zeolite catalyst throughout the 150° C.–500° C. temperature range.

EXAMPLE 5

Figure 2:
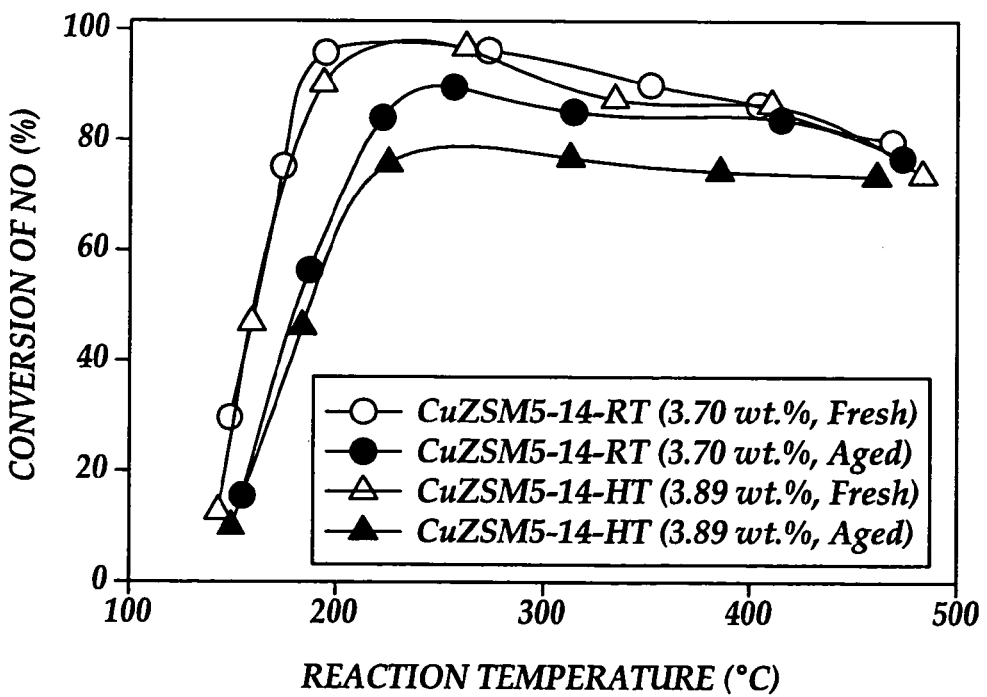
FIG. 2 is a graph depicting nitrogen oxides removal efficiency (%) of Cu/zeolite catalysts as a function of reaction temperatures, wherein the Cu/zeolite catalysts are prepared according to the methods of Examples 5 and 6.

Cu/zeolite (CuZSM5-14-RT) catalyst comprising 3.70% copper ions by weight was prepared by the same process as that in Example 1, except the sequential process (including the ion exchange reaction, filtering, washing and drying process) was repeated four times instead of three times. Nitrogen oxide-removing efficiency and hydrothermal stability of the Cu/zeolite catalyst were measured according to the processes of Examples 2 and 3, respectively. The results are shown in FIG. 2, in which the fresh Cu/zeolite catalyst is represented by the line-connected open circles. It can be seen from the graph that the fresh 3.70% Cu/zeolite catalyst exhibited nearly complete NO conversion in the 200° C.–300° C. reaction range, and this NO conversion efficiency slightly and gradually decreased to just above 80% at about 475° C. Furthermore, the aged 3.70% Cu/zeolite catalyst, represented by the line-connected solid circles, exhibited a conversion efficiency which was notably less than that of the fresh catalyst in the temperature range 150° C.–400° C., but substantially matched that of the fresh 3.70% catalyst at 400° C. and beyond.

EXAMPLE 6

Cu/zeolite (CuZSM5-14-HT) catalyst comprising 3.89% copper ions by weight was prepared by the same process as that in Example 1, except the mixture was agitated at a temperature of 80° C. instead of room temperature. The preparation process (including the ion exchange reaction, filtering, washing and drying process) was repeated three times as in Example 1. Nitrogen oxide-removing efficiency and hydrothermal stability of the Cu/zeolite catalyst were measured according to the processes of Examples 2 and 3, respectively. The results are shown in the graph of FIG. 2, in which the fresh 3.89% Cu/zeolite catalyst is represented by the line-connected open triangles.

The graph of FIG. 2 indicates that the nitrogen oxide-removing efficiency of the fresh 3.89% Cu/zeolite catalyst, prepared using an ion exchange reaction carried out at 80° C. according to Example 6, closely approximated the efficiency of the fresh 3.70% Cu/zeolite catalyst which was prepared using an ion exchange reaction carried out at room temperature although the efficiency of the fresh 3.70% Cu/zeolite catalyst was slightly higher where the two diverged. However, the graph further indicates that the nitrogen oxide-removing efficiency of the aged 3.89% Cu/zeolite catalyst, which is represented by the line-connected solid triangles, was notably less than the nitrogen oxide-removing efficiency of both the fresh 3.70% Cu/zeolite catalyst and the aged 3.70% Cu/zeolite catalyst throughout the entire 150° C.–500° C. temperature range. This indicates that the 3.70% Cu/zeolite catalyst prepared using the ion exchange reactions carried out at room temperature have a hydrothermal stability which is superior to that of the 3.89% Cu/zeolite catalyst prepared using the ion exchange reactions carried out at 80° C.

It will be appreciated from a consideration of FIGS. 1 and 2 that the Cu/zeolite (CuZSM5-14-RT) catalysts prepared by ion exchange reactions carried out at room temperature exhibit nitrogen oxide-removing efficiencies which are superior to those of the Cu/zeolite catalysts prepared by ion exchange reactions carried out at high temperatures. It is further apparent from a consideration of FIGS. 1 and 2 that the Cu/zeolite catalysts prepared by ion exchange reactions carried out at room temperature exhibit superior hydrothermal stability as compared to the hydrothermal stability of the Cu/zeolite catalysts prepared by ion exchange reactions carried out at high temperatures. This holds true for both fresh and hydrothermally-aged catalysts. It has been found that a CuZSM5 catalyst having 3.5% copper by weight exhibits nearly complete NO conversion in the 200–350° C. reaction range. When equimolar quantities of NO and $NH_3$ reducing agent are used, this high NO conversion activity is maintained at temperatures of up to 500° C. The Cu/zeolite catalyst prepared using the ion exchange reaction at room temperature has been found to exhibit high nitrogen oxide-removing activity even after hydrothermal aging of the catalyst at 700° C. for 24 hours in the presence of 10% water.

While the preferred embodiments of the invention have been described above, it will be recognized and understood that various modifications can be made in the invention and the appended claims are intended to cover all such modifications which may fall within the spirit and scope of the invention.

What is claimed is:

1. A process for preparing a catalyst, comprising the steps of:
    providing a zeolite carrier having a silicon/aluminum mole ratio of from about 14 to about 95;
    providing a cupric salt aqueous solution;
    defining a copper zeolite catalyst by carrying out an ion exchange reaction between copper ions and said zeolite carrier in said cupric salt aqueous solution at a temperature of from about 4° C. to about 14° C.; and
    calcinating said copper zeolite catalyst.

2. The process of claim 1 wherein said copper zeolite catalyst comprises a copper content of from about 0.1% to about 10.0% by weight.

3. The process of claim 1 wherein said calcining said copper zeolite catalyst comprises calcining said copper zeolite catalyst at a temperature of from about 300° C. to about 700° C.

4. The process of claim 3 wherein said copper zeolite catalyst comprises a copper content of from about 0.1% to about 10.0% by weight.

5. The process of claim 1 wherein said cupric salt aqueous solution is copper sulfate, copper nitrate, copper acetate or copper chloride having a concentration of from about 0.001 molar to about 10 molar.

6. The process of claim 5 wherein said calcining said copper zeolite catalyst comprises calcining said copper zeolite catalyst at a temperature of from about 300° C. to about 700° C.

* * * * *